March 2, 1971     E. J. SZKARADEK ET AL     3,567,262

SELF-ALIGNING DOUBLE-BALL JOINT

Filed May 2, 1969

INVENTORS
EDWARD J. SZKARADEK
DONALD L. NEPP
BY Fulwider, Patton, Rieber,
Lee, and Utecht
ATTORNEYS

United States Patent Office 3,567,262
Patented Mar. 2, 1971

3,567,262
SELF-ALIGNING DOUBLE-BALL JOINT
Edward J. Szkaradek, Santa Ana, and Donald L. Nepp, San Pedro, Calif., assignors to Western Hydraulics, Inc.
Filed May 2, 1969, Ser. No. 821,395
Int. Cl. F16c 11/06
U.S. Cl. 287—88                                          7 Claims

ABSTRACT OF THE DISCLOSURE

A self-aligning, double-ball joint interconnecting a pair of actuator rods including a clevis on the end of one rod in the opposite legs of which are concave bearing rings in which are mounted split segments of a bearing ball having central openings therethrough. The second actuator rod has a torque on its end providing an enlarged flat eye which is mounted in the clevis and has a bearing ring pressed, swaged or otherwise rigidly secured therein, the ring presenting a concave surface and being swaged about a central bearing ball therein. The bearing ball has a central opening therethrough and the ball and ball segments are rigidly connected together by a through bolt, with spaces provided between the clevis and the tongue therein to permit free relative twisting, as well as rotational movement. The disclosure includes the mounting of the clevis within a second clevis connected to a part to be operated, with the through bolt also passing through the last-mentioned clevis. The clevises are also spaced apart to permit relative twisting movement therebetween.

Figure 1:
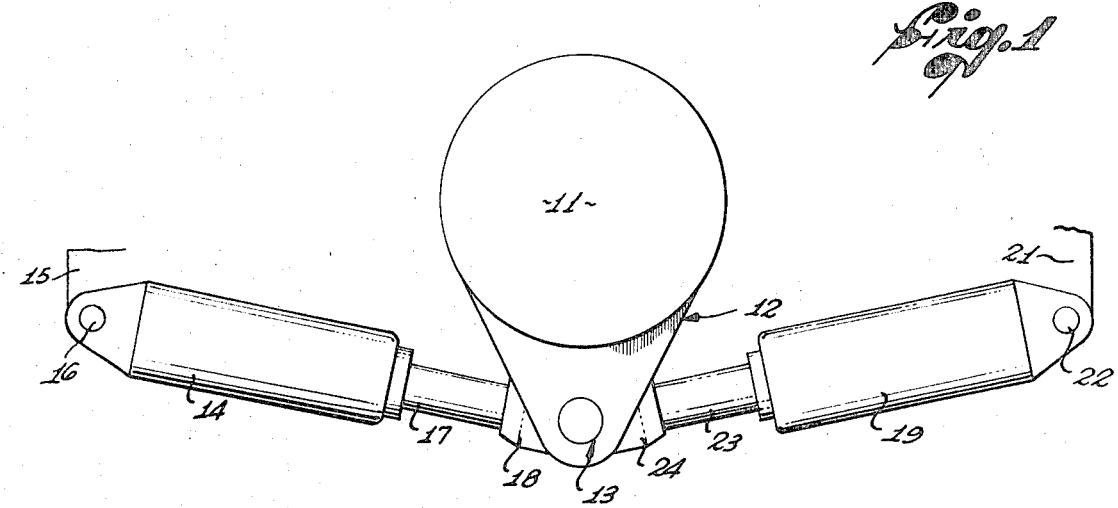

BACKGROUND OF THE INVENTION (1) This invention relates to the field of rotational ball joints, and more particularly to such joints of the self-aligning type.

(2) Joints and couplings employing ball connections are well known in the prior art, but specific applications, such as connecting double actuators to an operated part, have presented difficulties in stress and strain which are induced by relative twisting between the actuator rods and between the rods and the operated part. The joint of the present invention precludes such stresses by providing for limited twisting movement between an actuator clevis and an operated clevis within which it is mounted, and for further relative twisting movement between the tongue or eye on the end of one actuator rod which is received in a clevis on the end of the other actuator rod. By thus providing for free twisting movement between the tongue and clevis and between the clevises, stresses in the joint are avoided.

SUMMARY OF THE INVENTION

The invention has for its object the provision of a self-aligning, double-ball joint which avoids twisting stresses in a rotatable connection between a pair of actuator rods and an operated part. To provide for such free twisting movement, as well as for rotational movement, the end of one rod is provided with a clevis in which a tongue or eye on the end of the other rod is received. Large aligned openings in the opposite legs of the clevis have concave bearing rings pressed or swaged therein and a split bearing ball provides segment rings received in the bearing rings and providing convex bearing surfaces complementary to the concave bearing surfaces on the bearing rings. The tongue or enlarged eye on the other operating rod is received in the clevis and has a bearing ring pressed or swaged in its opening which presents a concave bearing surface receiving a bearing ball therein and about which it is swaged. Thereby, the first actuator rod is freely movable in twisting and rotating directions relative to the split bearing ball segments in its clevis bearing rings, and the second actuator rod has free twisting and rotating movements relative to the bearing ball mounted in the bearing ring mounted in the eye of its tongue which is received in the clevis.

The bearing ball and split bearing ball segments have central openings therethrough to receive a through bolt and are axially dimensioned so as to separate the central tongue from the clevis legs, and also to separate the clevis legs from an operated bracket clevis in which the joint clevis is mounted. Thereby, the inner clevis is freely twistable, as well as rotatable, relative to the outer bracket clevis, and the internal tongue is freely twistable and rotatable relative to the inner clevis in which it is mounted. The through bolt rigidly connects together axially the outer operated bracket clevis, the split bearing ball segments, and the central bearing ball into a rigid assembly relative to which the clevis and tongue on the ends of the actuator rods are relatively rotatable and have limited twisting movement to prevent stress or strain therein.

SHORT DESCRIPTION OF THE DRAWINGS

Figure 2:
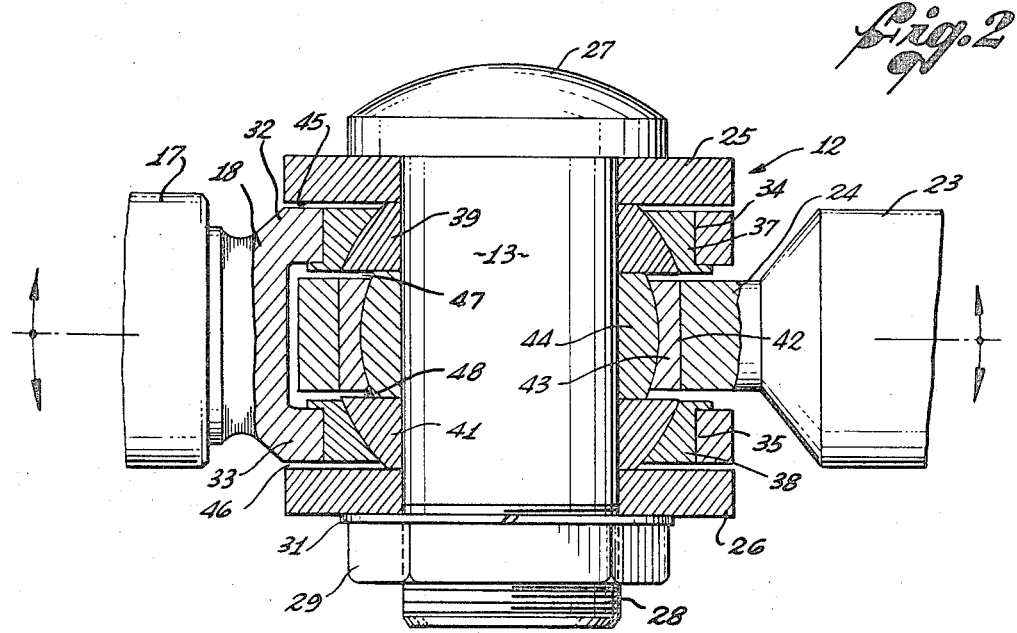

FIG. 1 is a plan view, mainly diagrammatic, of a pair of hydraulic actuators connected to an operated rotational part; and FIG. 2 is a sectional view through the joint of FIG. 1.

DESCRIPTION OF THE PREFERRED EMBODIMENT

FIG. 1 shows an operated element 11 rotationally mounted (by means not shown) and having extending radially thereof a bracket clevis 12 through which extends a joint bolt 13. A first hydraulic actuator cylinder 14 is pivotally mounted to a relatively fixed part 15 at pivot 16. An actuator rod 17 extends from the hydraulic cylinder 14 and has a clevis 18 on its exterior, free end. A second hydraulic cylinder 19 has one end pivotally mounted to a fixed part 21 at pivot 22 and has extending therefrom an actuator rod 23 carrying a tongue or eye 24 on its free end. The clevis 18 and tongue 24 are jointed together by a through bolt 13, as shown more particularly in FIG. 2, so as to effect rotation of the bracket clevis 12 and the operated element 11, as the hydraulic cylinders 14 and 19 are connected reversely to a source of fluid pressure by valving means not shown but conventional in the art. The axes of the operated element 14, the pivots 16 and 22, and the bolt 13 are substantially parallel.

As shown in FIG. 2, the operated bracket clevis 12 has legs 25, 26 with openings therethrough receiving the through bolt 13 whose head 27 bears against the outer surface of the leg 26. The clevis 18 is disposed between the legs 25 and 26 of clevis 12. Clevis 18 has legs 32 and 33 having openings therethrough at 34 and 35, respectively, in which are press fit or swaged partial bearing rings 37 and 38, respectively, presenting interior concave bearing surfaces. Within the partial bearing rings 37 and 38 are located the segments 39 and 41, respectively, of a split bearing ball.

Between the legs of the clevis 18, in spaced relation thereto, is disposed the tongue or eye 24 having its plane generally parallel to the planes of the clevis legs and provided with an opening 42 therethrough generally concentric with the openings 34 and 35 and with the axis of the bolt 13, within the opening 42 is swaged or press fit a bearing ring 43 which is, in turn, swaged about a partial bearing ball 44, the bearing ring 43 having a concave inner surface engaging in rotating relation the concave outer surface of the partial bearing ball 44. The bolt 13 extends through central openings through the partial bearing ball 45 and the bearing ball segments 39 and 41, and the nut 29 on the bolt 13 is drawn up tightly, so that the legs 25 and 26 of clevis bracket 12, the bearing ball segments 39 and 41, and the partial bearing ball 44 are drawn positively together, as shown in FIG. 2, into a unitary, rigid structure. The axial dimensions of the partial bearing ball 44 of the bearing ball segments 39 and 41 are such as to provide spaces at 45, 46, 47 and 48 between the adjacent clevis leg surfaces and between the inner clevis leg surfaces and the surfaces of the central tongue 24.

The bearing ball and bearing ring construction provides for relative working rotation, about the axis of the bolt 13, between the actuator rods 17 and 23 and between the actuator rods and the bracket clevis 12. The spaces 45 and 46 provide for twisting movement between the clevis 18 and the bracket clevis 25 at the bearing surface junction between the bearing ball segments 39 and 41, and the bearing rings 37 and 38, respectively. The spaces 47 and 48 provide for twisting movement between the actuator rods 17 and 23 at the bearing surface junctions between the bearing ball segments and their bearing rings and also between the partial bearing ball 44 and its bearing ring 43. The outer end diameters of the bearing ball 44 are not greater than the outer diameters of the adjacent bearing ball segment surfaces.

The above-described double-ball joint is therefore self-aligning and provides for ready twisting movement between a pair of actuator rods and between the actuator rods and the operated part to which they are connected. It therefore prevents the application of stress and strain to the joint as the operator rods may tend to twist relative to each other or relative to the operated part to which they are connected.

While a certain preferred embodiment of the invention has been specifically illustrated and described, it will be understood that the invention is not limited thereto, as many variations will be apparent to those skilled in the art, and the invention is to be given its broadest permissible interpretation.

We claim:

1. In a joint:
   a first part;
   a clevis on the end of said first part;
   a second part;
   a tongue on the end of said second part received between the legs of said clevis, said tongue being thinner than the distance between said legs to provide a space between the opposite faces of the tongue and the legs of the clevis;
   a bearing ring mounted in an opening through each clevis leg and having a concave spherical surface facing toward the center of the joint;
   a bearing ball segment in each of said clevis leg bearing rings;
   a bearing ring in an opening through said tongue having a concave surface facing the center of the joint;
   a partial bearing ball in said tongue bearing ring, the axial thickness of said partial bearing ball being such as to maintain the spacing between said tongue and the clevis legs;
   axial openings through said bearing ball segments and said partial bearing ball;
   connecting means passing through said last-mentioned openings and drawing said bearing ball segments and partial bearing ball tightly together, whereby said parts are not only rotatable relative to each other about the engagements between the ball, ball segments and bearing rings, but are relatively twistable, one relative to the other without stress, on the same bearing surfaces through the limits provided by the spacing between said tongue and clevis legs; and
   a bracket for an operated part mounted exteriorly of said clevis by said connecting means which also draws said brackets tightly against the adjacent bearing ball segment but with a space between the bracket and the adjacent clevis leg, so that the clevis may twist on the bearing ball segment relative to the bracket.

2. An operating mechanism utilizing the joint of claim 1, including:
   a pair of hydraulic operators;
   an operated part to which said bracket is connected; and
   said first and second parts being actuator rods extending from and actuated by the hydraulic cylinders.

3. The operating mechanism of claim 2, in which:
   said operated part has a pivotal axis;
   means mounting the ends of said hydraulic cylinders opposite said rods for rotation about axes parallel to the axis of said operated part; and
   the axis of said connecting means being substantially parallel to the axes of said operated part and hydraulic cylinders.

4. In a joint:
   a first part;
   a clevis on the end of said first part;
   a second part;
   a tongue on the end of said second part received between the legs of said clevis, said tongue being thinner than the distance between said legs to provide a space between the opposite faces of the tongue and the legs of the clevis;
   a bearing ring mounted in an opening through each clevis leg and having a concave spherical surface facing toward the center of the joint;
   a bearing ball segment in each of said clevis leg bearing rings;
   a bearing ring in an opening through said tongue having a concave surface facing the center of the joint;
   a partial bearing ball in said tongue bearing ring, the axial thickness of said partial bearing ball being such as to maintain the spacing between said tongue and the clevis legs;
   axial openings through said bearing ball segments and said partial bearing ball;
   connecting means passing through said last-mentioned openings and drawing said bearing ball segments and partial bearing ball tightly together, whereby said parts are not only rotatable relative to each other about the engagements between the ball, ball segments and bearing rings, but are relatively twistable, one relative to the other without stress, on the same bearing surfaces through the limits provided by the spacing between said tongue and clevis legs;
   said partial bearing ball extending axially substantially beyond both surfaces of said tongue; and
   the outer surfaces on said bearing ball segments extending substantially beyond the outer surfaces on said clevis legs.

5. The joint defined in claim 4, in which:
   the outer surfaces on said partial bearing ball have outer diameters not greater than the outer diameters of the inner surfaces of said bearing ball segments.

6. The joint defined in claim 5, including:
   a clevis having its legs disposed outside of, but in spaced relation to, the legs of the first clevis, said connecting means drawing the legs of said bracket clevis, the bearing ball segments, and the partial bearing ball tightly together into a substantially rigid construction with spaces between the clevis legs and between the legs of the first clevis and the tongue.

7. The joint defined in claim 6, in which:
   said connecting means is a through bolt having its head engaging the outer surface of the other leg of said bracket clevis to effect said rigid construction between the bracket clevis legs, the bearing ball segments, and the partial bearing ball.

References Cited

UNITED STATES PATENTS

| 2,037,208 | 4/1936 | Buckwalter | 287—100 |
| 2,919,942 | 1/1960 | Bechtel | 287—100X |
| 3,168,014 | 2/1965 | Aslan | 287—21X |
| 3,198,563 | 8/1965 | Steidl | 287—100X |
| 3,379,464 | 4/1968 | Bradshaw | 287—88 |
| 3,441,299 | 4/1969 | Pfaar | 287—88 |

THOMAS F. CALLAGHAN, Primary Examiner

A. V. KUNDRAT, Assistant Examiner

U.S. Cl. X.R.

287—100; 308—72